United States Patent
Wilson

[11] Patent Number: 5,394,645
[45] Date of Patent: Mar. 7, 1995

[54] PLANT SHELTER ANCHORING DEVICE

[76] Inventor: Roger A. Wilson, 2145 S. 65th St., West Allis, Wis. 53219

[21] Appl. No.: 177,523

[22] Filed: Jan. 4, 1994

[51] Int. Cl.⁶ ............................................. A01G 13/02
[52] U.S. Cl. ........................................... 47/30; 47/21; 248/154; 248/500
[58] Field of Search .............. 47/30, 30 OT, 23, 39 P, 47/21; 248/154, 500, 680, 681

[56] References Cited

U.S. PATENT DOCUMENTS

| | | | |
|---|---|---|---|
| 1,837,411 | 12/1931 | Cutter | 248/154 |
| 2,124,541 | 7/1938 | Cassey | 248/223.4 |
| 2,402,175 | 6/1946 | Mapes | 248/154 |
| 3,226,881 | 1/1966 | Garrett | 47/30 |

FOREIGN PATENT DOCUMENTS 70675  3/1991  Japan ................... 47/39 P

*Primary Examiner*—Henry E. Raduazo

[57] ABSTRACT

A new and improved plant shelter anchoring device for securing a commercially available conical exterior-gusseted square-flanged protective plant shelter to the ground whereby the plant shelter is prevented from blowing off the plant during high winds. The plant shelter anchoring device comprises a bracket having a horizontal planar triangular clamping member. The clamping member has an identical pair of downwardly extending sides, the sides each having an anchoring flange projecting outwardly from a bottom edge thereof. The anchoring flanges each have a plurality of spaced apart holes therethrough. The bracket is disposed in cooperative touching relationship with the corners of the plant shelter flange such that the plant shelter flange is trapped thereunder. The plant shelter anchoring device also includes a plurality of identical spikes having a point formed on one end and an enlarged head portion formed on the other end. The spikes each extend through a hole in the anchoring flange, then into the ground under the bracket whereby anchoring the bracket to the ground. In an alternate embodiment, the spikes are replaced by hold-down augers which extend through the holes in the flanges and bore into the ground under the bracket whereby anchoring the bracket to the ground.

4 Claims, 4 Drawing Sheets

PLANT SHELTER ANCHORING DEVICE

BACKGROUND OF THE INVENTION

1. Field of the Invention

The present invention relates to protective covers for outdoor plants and more particularly pertains to plant shelter anchoring devices which may be adapted for securing a commercially available conical exterior-gusseted square-flanged protective plant shelter to the ground whereby the plant shelter is prevented from blowing off the plant during high winds.

2. Description of the Prior Art

The use of plant shelters is known in the prior art. More specifically, plant shelters heretofore devised and utilized for the purpose of protecting plants from hostile weather conditions are known to consist basically of familiar, expected and obvious structural configurations, notwithstanding the myriad of designs encompassed by the crowded prior art which have been developed for the fulfillment of countless objectives and requirements.

The present invention is directed to improving devices for securing a commercially available protective plant shelter to the ground whereby the plant shelter is prevented from blowing off the plant during high winds in a manner which is safe, secure, economical and aesthetically pleasing.

For example, U.S. Pat. No. 3,571,972 to Carter discloses a protective ground collar for enveloping upright elements such as trees, posts and the like at ground level to inhibit the growth of vegetation, a collar is formed of flexible water resistant sheet material and a main opening is formed therein from which a main slit extends to the outer edge of the sheet material, the main slit being for the purpose of facilitating envelopment of a tree trunk and the like. A plurality of radial inner slits are formed in the sheet and extend outwardly from the central opening to define a plurality of flexible fingers which are disposed against the tree trunk or post to inhibit plant growth.

U.S. Pat. No. 3,932,958 to Kistler, Jr. et al. describes a plant shelter including a plurality of posts mounted upright from a supporting surface and arranged in longitudinally and transversely aligned rows to form a series of adjacent rectangles. A plurality of parallel and substantially uniformly spaced wires extend longitudinally of said posts and are connected to the upper ends of the longitudinally aligned posts, the opposite ends of said longitudinal wires being anchored at said supporting surface. A plurality of parallel and uniformly spaced transverse wires are connected between each pair of adjacent longitudinal wires at uniform intervals therealong, which intervals are only a fraction of the distance between the adjacent longitudinal wires, said transverse wires being substantially coplanar. A plurality of elongated spaced and parallel elements are connected by flexible means so that said elements can be stored in a roll which can be mounted upon and then unrolled along a pair of said transverse wires between a pair of longitudinal wires. By this means, the amount of light reaching said surface surrounded by rectangles can be controlled.

The prior art also discloses a soil cover for potted or in-ground plants as shown in U.S. Pat. No. 4,995,192 to DeWid which consists of a soil cover that when installed around the base of an existing plant or tree, forms a cone-like shape, truncated at the top to allow stem or trunk to pass through. Thus installed, the cover prevents over watering of the soil around the plant due to excessive rain and consequential loss of soil nutrients, loss of soil, root exposure. It gives the plant owner the capability to control the moisture conditions of a plant's soil.

A reusable temporary cover for indoor house plants to retain moisture for the plant is shown in U.S. Pat. No. 4,265,049 to Gorewitz. The cover is formed of flexible transparent plastic sheet material with tie means to completely enclose a house plant and includes a water retention portion to catch and store excess water. By enclosing the plants after watering, a terrarium effect is produced and moisture is retained within the cover for a long period of time.

Also relevant is U.S. Pat. No. 4,821,453 to Morehead which describes a plant protecting and growth enhancing device for use in providing an environment immediately surrounding a plant to protect the plant from atmospheric changes during its early life of growing. The plant protector is a rigid, conical, transparent device that is adapted to contain a fluid that may absorb thermal energy from an outside source and may release that absorbed thermal energy at another time. The device is adapted to be placed over a seedling plant as the plant is planted and is capable of protecting the plant from frost or other possible detrimental conditions until the plant has a chance to become established. The fluid within the device may be drained onto the plant when the device is no longer needed.

While these devices fulfill their respective, particular objectives and requirements, the aforementioned patents do not disclose a plant shelter anchoring device for securing a commercially available plant shelter to the ground whereby the plant shelter is prevented from blowing off the plant during high winds.

In this respect, the plant shelter anchoring device according to the present invention substantially departs from the conventional concepts and designs of the prior art, and in so doing provides an apparatus primarily developed for the purpose of securing a commercially available conical exterior-gusseted square-flanged protective plant shelter to the ground whereby the plant shelter is prevented from blowing off the plant during high winds.

Therefore, it can be appreciated that there exists a continuing need for new and improved plant shelter anchoring devices which can be used for securing a commercially available protective plant shelter to the ground whereby the plant shelter is prevented from blowing off the plant during high winds. In this regard, the present invention substantially fulfills this need.

As illustrated by the background art, efforts are continuously being made in an attempt to develop devices for protecting plants from hostile weather conditions. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of plant shelters now present in the prior art, the present invention provides an improved plant shelter anchoring device construction wherein the same can be utilized for securing a commercially available protective plant shelter to the ground whereby the plant shelter is prevented from blowing off the plant during high winds. As such, the general purpose of the present invention, which will be described subsequently in greater detail, is to provide a new and improved plant shelter anchoring device apparatus and method which has all the advantages of the prior art plant shelter anchoring devices and none of the disadvantages.

The invention is defined by the appended claims with the specific embodiment shown in the attached drawings. For the purpose of summarizing the invention, the invention may be incorporated into a new and improved plant shelter anchoring device for securing a commercially available conical exterior-gusseted square-flanged protective plant shelter to the ground whereby the plant shelter is prevented from blowing off the plant during high winds. The plant shelter anchoring device comprises a plurality of identical generally triangular-shaped brackets formed of corrosion-resistant rigid material such as plastic each having an identical pair elongated planar sides disposed laterally at right angles to each other. The sides each have an integrally or otherwise connected longitudinal flange projecting outwardly from a bottom edge thereof normal to the sides. The flanges each have a plurality of evenly spaced apart round holes therethrough disposed along the longitudinal centerline thereof. The sides also have an integrally or otherwise connected generally triangular planar top extending therebetween. The top has a concavedly curved open edge generally conforming to the curve of the plant shelter. The top also has a radial notch extending inwardly from the curved open edge to provide clearance for a shelter flange gusset. A bracket is clampingly disposed at each corner of the plant shelter flange.

The plant shelter anchoring device also includes a plurality of identical hold-down spikes formed of impact-resistant, corrosion-resistant, rigid material such as plastic. The spikes each have a shank with a diameter essentially the same as the diameter of the holes through the flanges. The spikes each also have an enlarged head portion on one end, the head portion being substantially larger than the holes through the flanges whereby the spikes are precluded from passing entirely through the holes in the flanges. The spikes each additionally have a point formed on the other end. The spikes each extend through a hole in the flanges with the head portion being in touching holding relationship with the flanges. The spikes each also extend into the ground under the brackets whereby anchoring the brackets to the ground.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved plant shelter anchoring device for securing a commercially available protective plant shelter to the ground whereby the plant shelter is prevented from blowing off the plant during high winds.

It is therefore an additional object of the present invention to provide a new and improved plant shelter anchoring device which has all the advantages of the prior art plant shelter anchoring devices and none of the disadvantages.

It is another object of the present invention to provide a new and improved plant shelter anchoring device which may be easily and efficiently manufactured and marketed.

It is a further object of the present invention to provide a new and improved plant shelter anchoring device which is of a durable and reliable construction.

An even further object of the present invention is to provide a new and improved plant shelter anchoring device which is susceptible of a low cost of manufacture with regard to both materials and labor, and which accordingly is then susceptible of low prices of sale to the consuming public, thereby making such plant shelter anchoring devices economically available to the buying public.

Still yet another object of the present invention is to provide a new and improved plant shelter anchoring device which provides in the apparatuses and methods of the prior art some of the advantages thereof, while simultaneously overcoming some of the disadvantages normally associated therewith.

Still yet another object of the present invention is to provide a new and improved plant shelter anchoring device which is reusable.

Still yet another object of the present invention is to provide a new and improved plant shelter anchoring device which is of universal construction so as to fit a wide variety of commercially available plant shelters.

Still yet another object of the present invention is to provide a new and improved plant shelter anchoring device which will not damage the plant shelter during use thereby prolonging the useful life of the plant shelter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
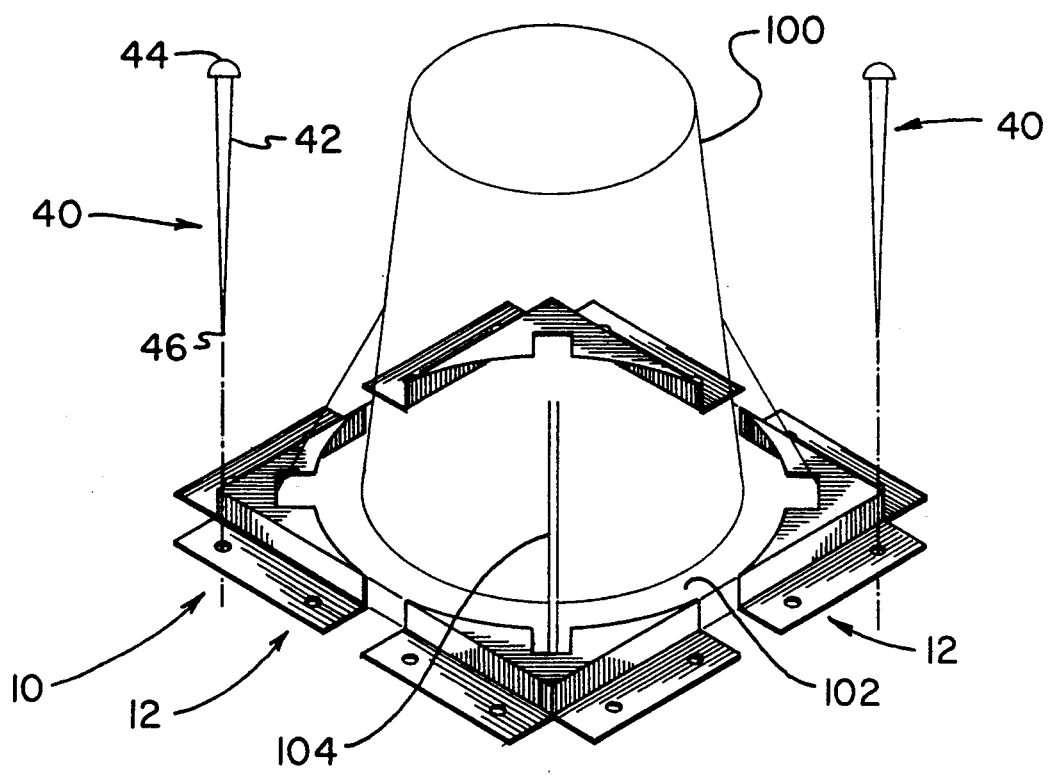
FIG. 1 is a perspective view of the present invention showing its manner of use.
Figure 2:
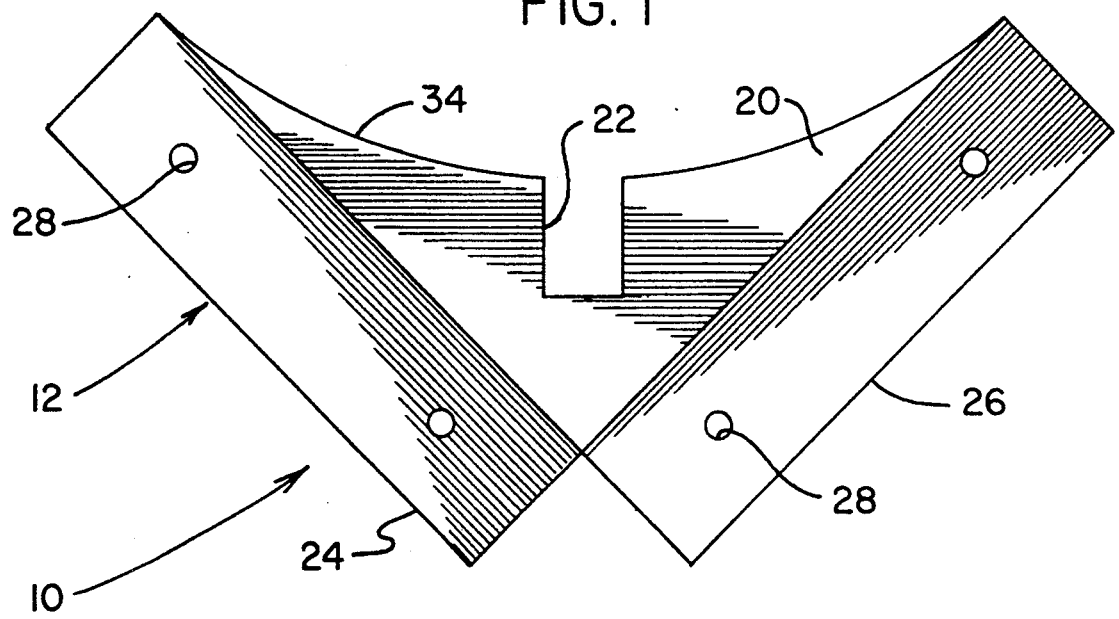
FIG. 2 is a top plan view of the invention of FIG. 1.
Figure 3:
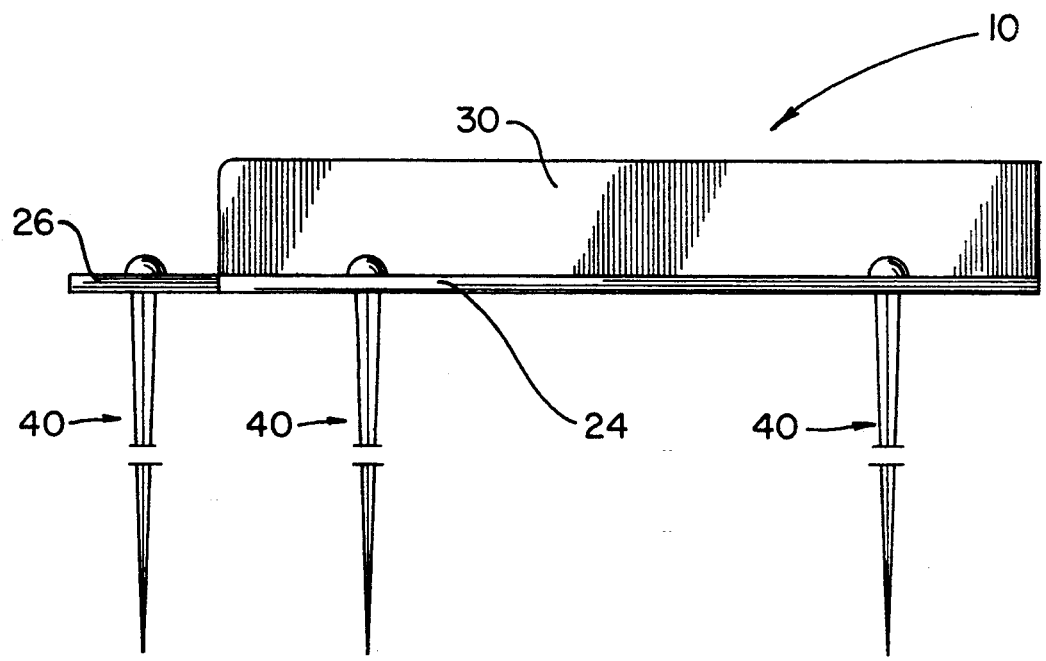
FIG. 3 is a side elevational view of the invention of FIG. 1.
Figure 4:
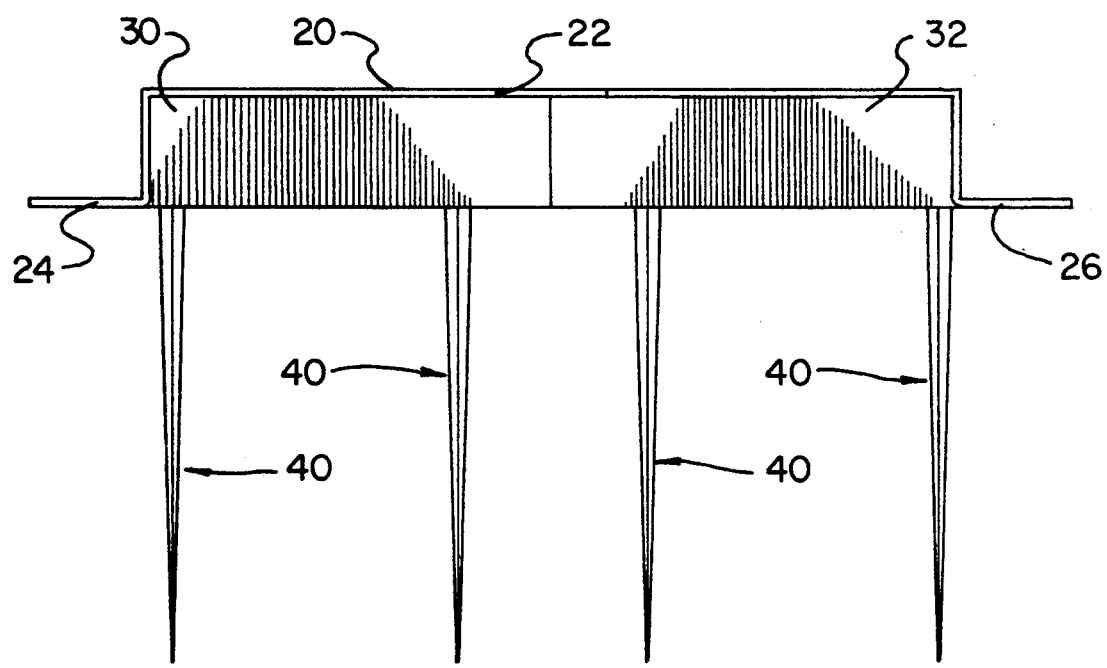
FIG. 4 is a front elevational view of the invention of FIG. 1.

With reference now to the drawings, and in particular to FIG. 1 thereof, a new and improved plant shelter anchoring device embodying the principles and concepts of the present invention and generally designated by the reference numeral 10 will be described.

From an overview standpoint, the plant shelter anchoring device is adapted for use for anchoring a commercially available protective plant shelter to the ground whereby the plant shelter is prevented from blowing off the plant during high winds. See FIG. 1.

With reference now to FIGS. 1–4 and more specifically, it will be noted that a plant shelter anchoring device 10 for securing a commercially available conical exterior-gusseted square-flanged protective plant shelter 100 to the ground plant during high winds is shown. The plant shelter anchoring whereby the plant shelter 100 is prevented from blowing off the device 10 comprises a plurality of identical generally triangular-shaped brackets 12, formed of corrosion-resistant rigid material such as plastic, each having an identical pair elongated planar sides 30 and 32 disposed laterally at right angles to each other.

The sides 30 and 32 each have an integrally or otherwise connected longitudinal flange 24 and 26 projecting outwardly from a bottom edge thereof normal to the sides. The flanges 24 and 26 each have a plurality of evenly spaced apart round holes 28 therethrough disposed along the longitudinal centerline thereof. The sides 30 and 32 also have an integrally or otherwise connected generally triangular planar top 20 extending therebetween.

The top 20 has a concavedly curved open edge 34 generally conforming to the curve of the plant shelter 100. The top 20 also has a radial notch 22 extending inwardly from the curved open edge 34 to provide clearance for a shelter flange gusset 104. A bracket 12 is clampingly disposed at each corner of the plant shelter flange 102.

The plant shelter anchoring device 10 also includes a plurality of identical hold-down spikes 40 formed of impact and corrosion resistant, rigid material such as plastic. The spikes 40 each have a shank 42 with a diameter essentially the same as the diameter of the holes 28 through the flanges. The spikes 40 each also have an enlarged head portion 44 on one end, the head portion 44 being substantially larger than the holes 28 through the flanges whereby the spikes 40 are precluded from passing entirely through the holes 28 in the flanges 24 and 26.

The spikes 40 each additionally have a point 46 formed on the other end. The spikes 40 each extend through a hole 28 in the flanges 24 and 26 with the head portion 44 being in touching holding relationship with the flanges 24 and 26. The spikes 40 each also extend into the ground under the brackets 12 whereby anchoring the brackets 12 to the ground.

Figure 5:
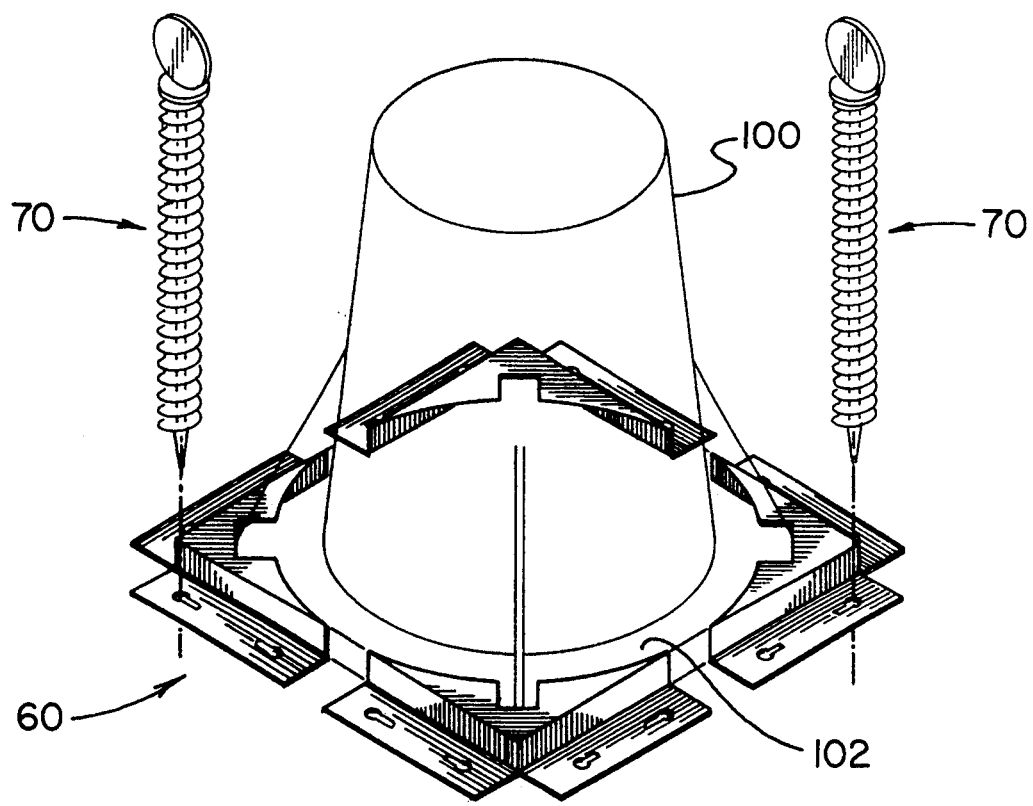
FIG. 5 is a perspective view of a first modification of the invention of FIG. 1 illustrating the manner of use of the hold-down augers.
Figure 6:
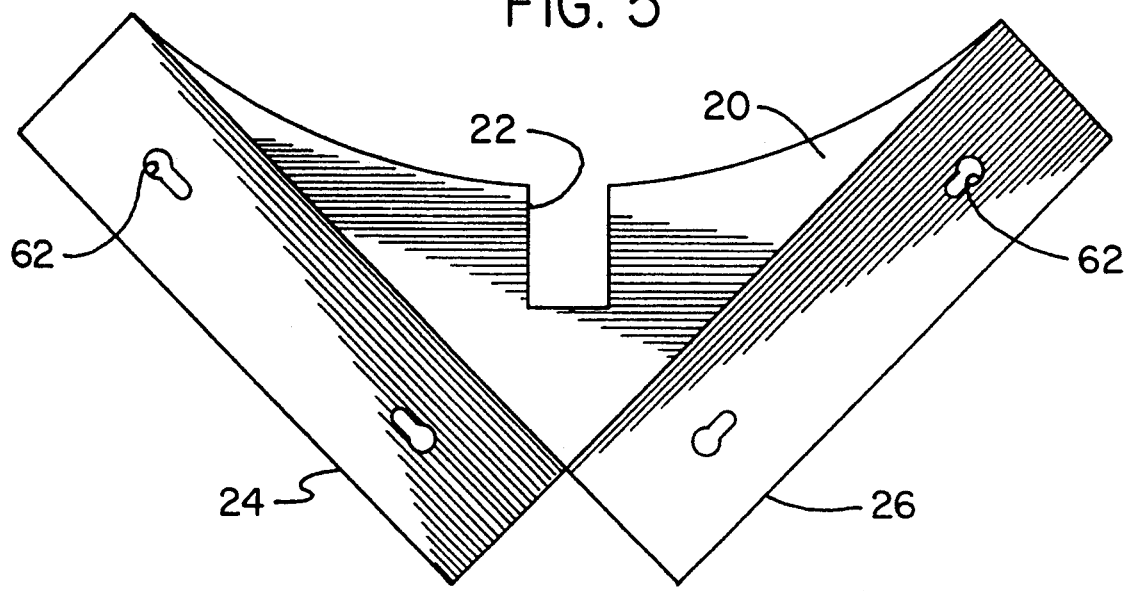
FIG. 6 is a top plan view of the invention of FIG. 5 showing the elongated slots added to the holes through the flanges.
Figure 7:
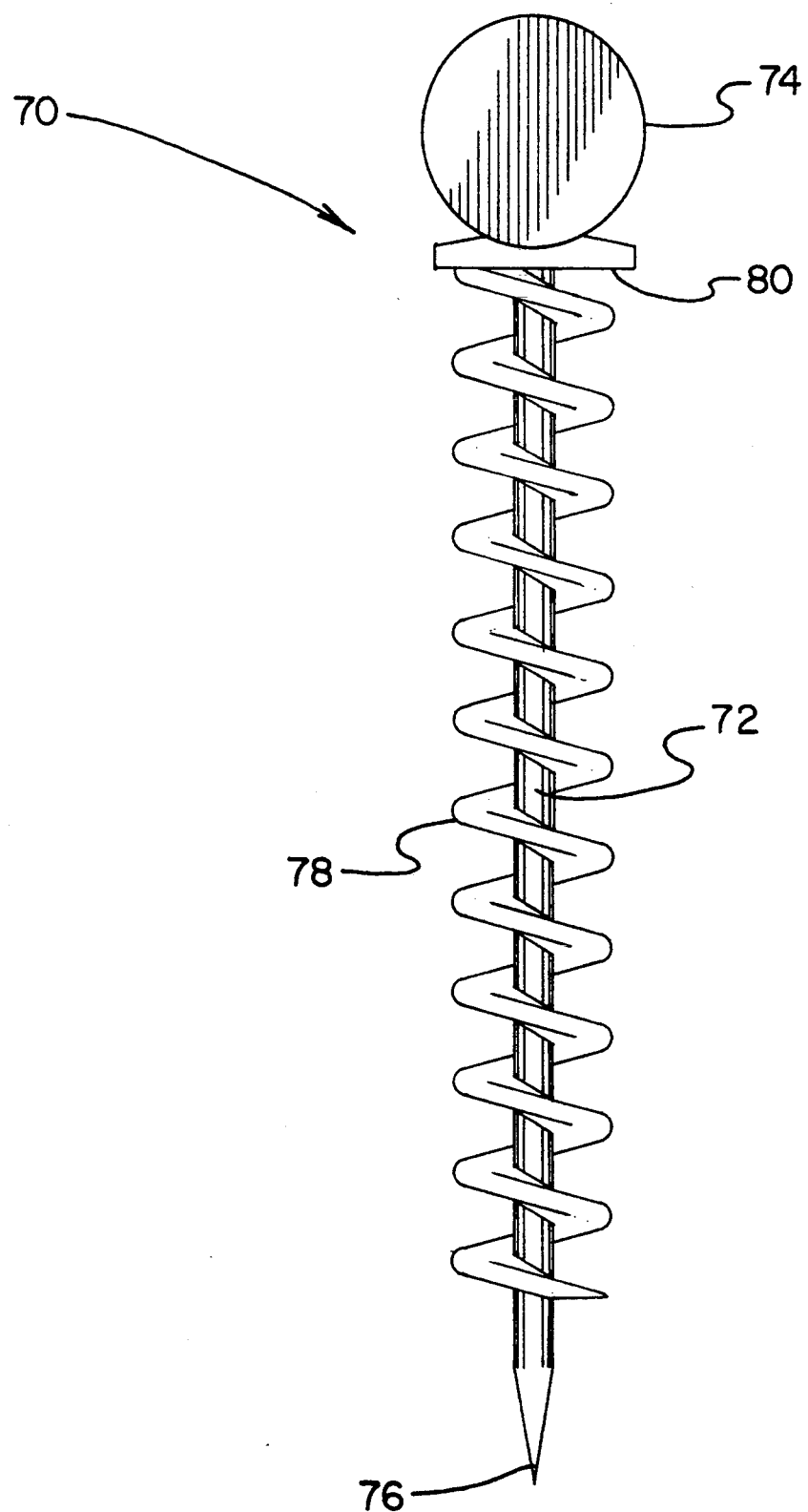
FIG. 7 is a front elevational view of a hold-down auger of the invention of FIG. 5.

An alternate embodiment of the present invention as generally designated by the reference numeral 60, which comprises of substantially all the features of the foregoing embodiment 10, is shown in FIGS. 5–7 wherein the holes 28 through the flanges 24 and 26 each have an added elongated slot 62 extending radially therefrom whereby a keyhole-shaped auger-blade receiving aperture is formed. The slots 62 lie parallel with the longitudinal axis of the flanges 24 and 26.

The alternate embodiment of the plant shelter anchoring device 60 further replaces the hold-down spikes 40 with hold-down augers 70. The hold-down augers 70, illustrated most specifically in FIG. 7, each comprise a shaft 72 formed of impact and corrosion resistant, rigid material such as plastic. The shaft 72 has a diameter essentially the same as the diameter of the round holes 28 through the flanges 24 and 26. The shaft 72 also has a point 76 formed on one end and a turning handle 74 formed on the other end.

The shaft additionally has an annular disc 80 formed thereon adjacent to the turning handle 74 whereby the hold-down auger 70 is precluded from passing entirely through the hole 28 in the flange 24 and 26. The shaft 70 further has a helical member 78 disposed thereon forming an auger blade. The hold-down auger 70 extends through a hole in the flange 28 such that the helical member 78 engages the elongated slot 62 of the hole 28. The hold-down auger 70 also extends into the ground under the bracket 12, the helical member 78 being threadedly engaged with the ground whereby anchoring the bracket 12 to the ground.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. A new and improved plant shelter anchoring device for securing a commercially available conical exterior-gusseted square-flanged protective plant shelter to the ground whereby the plant shelter is prevented from blowing off the plant during high winds, the plant shelter anchoring device comprising:

a plurality of identical generally triangular-shaped brackets having an identical pair elongated planar sides disposed laterally at right angles to each other, the sides each having an integrally longitudinal flange projecting outwardly from a bottom edge thereof normal to the sides, the flanges each having a plurality of evenly spaced apart round holes therethrough disposed along the longitudinal centerline thereof, the sides also having an integrally or otherwise connected generally triangular planar top extending therebetween, the top having a concavedly curved open edge generally conforming to the curve of the plant shelter, the top also having a radial notch extending inwardly from the curved open edge to provide clearance for an exterior shelter flange gusset, a bracket being clampingly disposed at each corner of the plant shelter flange; and a plurality of identical hold-down spikes, the spikes each having a shank with a diameter essentially the same as the diameter of the holes through the flanges, the spikes each also having an enlarged head portion on one end, the head portion being substantially larger than the holes through the flanges whereby the spikes are precluded from passing entirely through the holes in the flanges, the spikes each additionally having a point formed on the other end, the spikes extending through the holes in the flanges with the head portion being in touching holding relationship with the flanges, the spikes also extending into the ground under the brackets whereby anchoring the brackets to the ground.

2. The plant shelter anchoring device of claim 1 wherein the holes through the flanges each have an elongated slot extending radially therefrom whereby a keyhole-shaped auger-blade receiving aperture is formed, the slots lying parallel with the longitudinal axis of the flanges.

3. The plant shelter anchoring device of claim 2 said spikes further including:

a point formed on one end, the enlarged head additionally having a turning handle formed on the other end, the shaft further having a helical member disposed thereon whereby forming an auger blade, the hold-down auger extending through a hole in the flange such that the auger blade engages the elongated slot of the hole, the hold-down auger also extending into the ground under the bracket, the auger blade being threadedly engaged with the ground whereby anchoring the bracket to the ground.

4. A new and improved plant shelter anchoring device for securing a commercially available conical exterior-gusseted square-flanged protective plant shelter to the ground whereby the plant shelter is prevented from blowing off the plant during high winds, the plant shelter anchoring device comprising:

bracket means having a horizontal planar triangular clamping member, the clamping member having an identical pair of downwardly extending sides, the sides each having an anchoring flange projecting outwardly from a bottom edge thereof, and a plurality of identical spike means having a point formed on one end and an enlarged head portion formed on the other end, the spike means each extending through a hole in the anchoring flange.

* * * * *